United States Patent
Lekatsas et al.

(10) Patent No.: US 9,949,345 B2
(45) Date of Patent: Apr. 17, 2018

(54) TRANSIENT POWER COMMUNICATION

(71) Applicants: Nicholas Lekatsas, Malden, MA (US);
Biju Antony, Lynnfield, MA (US);
Anant Aggarwal, Waltham, MA (US)

(72) Inventors: Nicholas Lekatsas, Malden, MA (US);
Biju Antony, Lynnfield, MA (US);
Anant Aggarwal, Waltham, MA (US)

(73) Assignee: OSRAM SYLVANIA Inc., Wilmington, MA (US)

( * ) Notice: Subject to any disclaimer, the term of this patent is extended or adjusted under 35 U.S.C. 154(b) by 155 days.

(21) Appl. No.: 14/825,515

(22) Filed: Aug. 13, 2015

(65) Prior Publication Data
US 2015/0351183 A1 Dec. 3, 2015

Related U.S. Application Data

(62) Division of application No. 13/630,498, filed on Sep. 28, 2012, now Pat. No. 9,160,414.

(51) Int. Cl.
*H05B 37/02* (2006.01)
*H05B 33/08* (2006.01)

(52) U.S. Cl.
CPC ..... *H05B 37/0263* (2013.01); *H05B 33/0809* (2013.01)

(58) Field of Classification Search
CPC .................. H05B 37/0263; H05B 33/0809
See application file for complete search history.

(56) References Cited

U.S. PATENT DOCUMENTS

| | | |
|---|---|---|
| 4,398,178 A | 8/1983 | Russ et al. |
| 5,247,292 A | 9/1993 | Nakanishi et al. |
| 5,473,635 A * | 12/1995 | Chevroulet ......... G06F 13/4072 341/56 |
| 5,869,962 A | 2/1999 | Kasumi et al. |

(Continued)

FOREIGN PATENT DOCUMENTS

| | | |
|---|---|---|
| DE | 197 25 710 A1 | 1/1998 |
| EP | 0 798 901 A1 | 10/1997 |

(Continued)

OTHER PUBLICATIONS

Atmel Corporation, 8-bit AVR Microcontroller with 2/4/8K Bytes In-System Programmable Flash ATtiny25/V ATtiny45/V ATtiny85V, Apr. 2011, pp. 1-30.

(Continued)

*Primary Examiner* — Jason M Crawford
(74) *Attorney, Agent, or Firm* — Shaun P. Montana

(57) ABSTRACT

A power supply system providing communication from a master module to at least one slave module via transients, to alter operation of a load, is provided. The master module output a supply voltage that is either a normal supply voltage or a reduced supply voltage. The outputted supply voltage depends on input corresponding to a communication to be sent to the slave module to alter operation of the load of the slave module. The slave module receives the supply voltage and interprets the received supply voltage, which may vary between the normal and reduced supply voltages, to determine what the communication from the master module is. The slave module then uses information from the communication to appropriately alter operation of its load.

4 Claims, 7 Drawing Sheets

(56) References Cited

U.S. PATENT DOCUMENTS

| | | |
|---|---|---|
| 5,872,429 A | 2/1999 | Xia et al. |
| 6,006,150 A | 12/1999 | Ueda |
| 6,070,114 A | 5/2000 | Fendt et al. |
| 6,160,842 A | 12/2000 | DeLong et al. |
| 6,256,557 B1 | 7/2001 | Avila et al. |
| 6,664,745 B2* | 12/2003 | Belliveau ............ H04N 9/3141 315/315 |
| 6,744,820 B1* | 6/2004 | Khairallah ............ B60R 21/01 340/438 |
| 7,859,397 B2 | 12/2010 | Lamon et al. |
| 8,278,845 B1* | 10/2012 | Woytowitz ......... H05B 37/0263 307/1 |
| 8,531,135 B2* | 9/2013 | Park .................. H05B 37/0272 315/307 |
| 2002/0065583 A1* | 5/2002 | Okada .................... H04B 3/54 700/295 |
| 2004/0071208 A1 | 4/2004 | Yang et al. |
| 2006/0203936 A1 | 9/2006 | Roovers et al. |
| 2007/0280054 A1 | 12/2007 | Watanabe |
| 2008/0136334 A1* | 6/2008 | Robinson .......... H05B 37/0254 315/151 |
| 2008/0304580 A1 | 12/2008 | Ichiyama |
| 2009/0133942 A1 | 5/2009 | Iisaka et al. |
| 2012/0133298 A1* | 5/2012 | Campbell .......... H05B 33/0833 315/250 |
| 2012/0323394 A1* | 12/2012 | Gandhi ............. H05B 33/0857 700/297 |
| 2013/0101056 A1 | 4/2013 | Ahn et al. |
| 2014/0091732 A1* | 4/2014 | Lekatsas ................ H04B 3/548 315/307 |
| 2014/0093002 A1* | 4/2014 | Lekatsas ................ H04B 3/548 375/259 |

FOREIGN PATENT DOCUMENTS

| | | |
|---|---|---|
| GB | 2 471 860 A | 1/2011 |
| WO | 02/33843 A1 | 4/2002 |

OTHER PUBLICATIONS

M De Iulis, International Search Report and Written Opinion of the International Searching Authority for PCT/US2013/060410, dated Jan. 7, 2014, pp. 1-10, European Patent Office, Rijswijk, The Netherlands.

* cited by examiner

TRANSIENT POWER COMMUNICATION

CROSS-REFERENCE TO RELATED APPLICATIONS

The present application is a divisional of U.S. patent application Ser. No. 13/630,498, now U.S. Pat. No. 9,160,414, filed on Sep. 28, 2012 and entitled "TRANSIENT POWER COMMUNICATION", and is related to U.S. patent application Ser. No. 13/630,676, filed on Sep. 28, 2012 and entitled "PULSE-BASED BINARY COMMUNICATION", the entire contents of both of which are hereby incorporated by reference.

TECHNICAL FIELD

The present invention relates to communications, and more specifically, to communications over a line that also transmits electrical power.

BACKGROUND

A typical power supply system for modules (also referred to throughout as a "modular power system") includes a centralized power source supplies energy to one or more modules (i.e., devices), that may, in turn, utilize the energy to perform various tasks. For example, a modular power system may receive alternating current (AC) power and generate direct current (DC) power to operate at least one lighting module. Some modular powers systems also contain control features. For example, control may be centralized in a "master" module that is configured to issue commands that cause one or more "slave" modules to alter operation. A typical control implementation has the master module being coupled to the slave modules via dedicated communication lines or via dedicated wireless communication. Another typical control implementation is to transmit communication over the same conductors that supply power to the slave modules, known in the art as "power line communications." Existing power line communications systems operate by impressing a modulated carrier signal on the wiring system.

SUMMARY

Conventional techniques for spreading control through a module power system suffer from a variety of deficiencies. Dedicated communication lines may not be feasible in systems that are limited by space and/or cost and must be equipped for hazardous operation. Dedicated wireless communication results in more complexity, and thus more cost, as a network of transmitters and receivers must be set up across the master module and the slave module. Conventional power line communication systems may be effective, but still require specialized communication circuit, increasing cost and complexity and requiring further space that may not be available. Further, in systems requiring simple interactions, conventional power line communication systems are frequently overkill.

Embodiments of the present invention provide systems and methods relating to a particular power line communication system referred to throughout as transient power communication. With transient power communication, a system includes front end circuit that is coupled to a master module. At least one slave module is coupled to the master module via a conductor (e.g., wire). The slave module operates a load. The master module is configured to supply power and information to the at least one slave module via the wire. The master module includes a voltage change circuit and a master controller. The voltage change circuit receives a DC input voltage from the front end circuit, and generates either (1) a normal supply voltage or (2) a transient (e.g., a reduced supply voltage) for the at least one slave module. This generation is based on an input provided by the master controller. The at least one slave module includes a voltage change sensing circuit, a filter circuit, a slave controller, and an output circuit. The voltage change sensing circuit receives a normal supply voltage or a transient (e.g., a reduced supply voltage), and generates logic level voltages based on what is received. For example, a logic level voltage of "0" may be generated while the transient (the reduced supply voltage) is received, and logic level voltage of "1" may be generated while the normal supply voltage is received. The filter circuit receives the supply voltage, filters it, and makes sure that its output is the normal supply voltage, regardless of what supply voltage the slave module receives from the master module. The slave controller receives the logic level voltages from the voltage change circuit, which allow the slave controller to receive and interpret communications sent from the master module. The slave controller provides a control output to the output circuit. The output circuit also receives the filtered "normal" supply voltage, and based on the control output, changes the normal supply voltage before outputting it to a load. In this way, communications from the master module to the slave module occur on a single line without interrupting operation of the load during communications and allowing changes to the operation of the load via the communications.

In an embodiment, there is provided a power supply system. The power supply system includes: a master module configured to output a supply voltage, including: a front end circuit configured to generate a regulated front end direct current (DC) voltage based on an input voltage; a voltage change circuit coupled to the front end circuit and having a first mode of operation and a second mode of operation, wherein during the first mode of operation the voltage change circuit is configured to generate a normal supply voltage as the output of the master module, wherein during the second mode of operation the voltage change circuit is configured to generate a reduced supply voltage as the output of the master module, wherein the normal supply voltage and the reduced supply voltage are each based on the regulated front end DC voltage, and wherein the mode of operation is based on reception of a control input; and a master controller coupled to the voltage change circuit, wherein the master controller is configured to receive an input and to change the mode of operation of the voltage change circuit by providing a control input to the voltage change circuit, wherein the control input is based on the received input; a slave module configured to receive the supply voltage and to operate a load thereby, the slave module including: a voltage change sensing circuit configured to receive the supply voltage and to generate different logic level voltages based on the supply voltage received; a filter circuit configured to receive the supply voltage and to provide an output voltage that is equivalent to the normal supply voltage regardless of the supply voltage received; a slave controller coupled to the voltage change circuit, wherein the slave controller is configured to receive the different logic level voltages and to interpret the different logic level voltages as a communication of information from the master module, and wherein the slave controller is configured to provide a control output based on the communicated information; and an output circuit coupled to the filter circuit and the slave controller, wherein the output circuit is configured to receive the output voltage and the control output and to provide a load output based on the output voltage and the control output; a connection between the master module and the slave module configured to transmit the supply voltage from the master module to the slave module; and a load coupled to the output circuit of the slave module and configured to receive the load output from the slave module and to operate according to the received load output.

In a related embodiment, the voltage change circuit may be configured to operate in the first mode of operation when no control input is received from the master controller. In another related embodiment, the voltage change circuit may further include a transistor and a diode, the master controller may be configured to provide the control input to the transistor, changing the mode of operation of the voltage change circuit from the first mode to the second mode, such that the transistor is configured to cause the normal supply voltage to drop over the diode so as to generate the reduced supply voltage. In a further related embodiment, the voltage change circuit may further include a bleeder circuit configured to allow current to flow through the diode to generate the reduced supply voltage.

In yet another related embodiment, the voltage change sensing circuit may be configured to generate a certain logic level voltage to the slave controller while the voltage change sensing circuit is receiving the reduced supply voltage.

In still another related embodiment, the voltage change sensing circuit may be configured to generate a certain logic level voltage to the slave controller while the voltage change sensing circuit is receiving the reduced supply voltage, to continue generating the certain logic level voltage to the slave controller after later receiving the normal supply voltage, and to stop generating the certain logic level voltage to the slave controller upon later again receiving the reduced supply voltage.

In yet still another related embodiment, the output circuit may include: a switched mode power supply circuit coupled to the filter circuit and the slave controller, wherein the switched mode power supply circuit may be configured to receive the output voltage and the control output and to provide a load output based on the output voltage and the control output. In a further related embodiment, the load may include a solid state light source, the control input may be a command to change an amount of light emitted by the solid state light source, and the load output may cause the solid state light source to so change the amount of light emitted thereby.

In another embodiment, there is provided a method of transient power communication. The method includes: determining information to transmit from a master module to a slave module; transmitting the information from the master module to the slave module by generating a supply voltage in the master module, wherein the supply voltage is one of a normal supply voltage and a reduced supply voltage, wherein the generated supply voltage is based on the information to be transmitted; receiving the supply voltage in the slave module; generating logic level voltages based on whether the received supply voltage is the normal supply voltage or the reduced supply voltage, wherein the logic level voltages correspond to the information; interpreting the logic level voltages to determine the information; and controlling operation of a load connected to the slave module based on the determined information.

In a related embodiment, generating logic level voltages may include generating a certain logic level voltage while the reduced supply voltage is received. In another related embodiment, generating logic level voltages may include: generating a certain logic level voltage while the reduced supply voltage is received; continuing to generate the certain logic level voltage after later receiving the normal supply voltage; and stopping generation of the certain logic level voltage upon later again receiving the reduced supply voltage. In still another related embodiment, controlling may include: controlling operation of a solid state light source connected to the slave module based on the determined information, wherein the determined information is to change an amount of light emitted by the solid state light source; and wherein so controlling operation of the solid state light source may cause the solid state light source to change the amount of light emitted thereby.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

DETAILED DESCRIPTION

Figure 1:
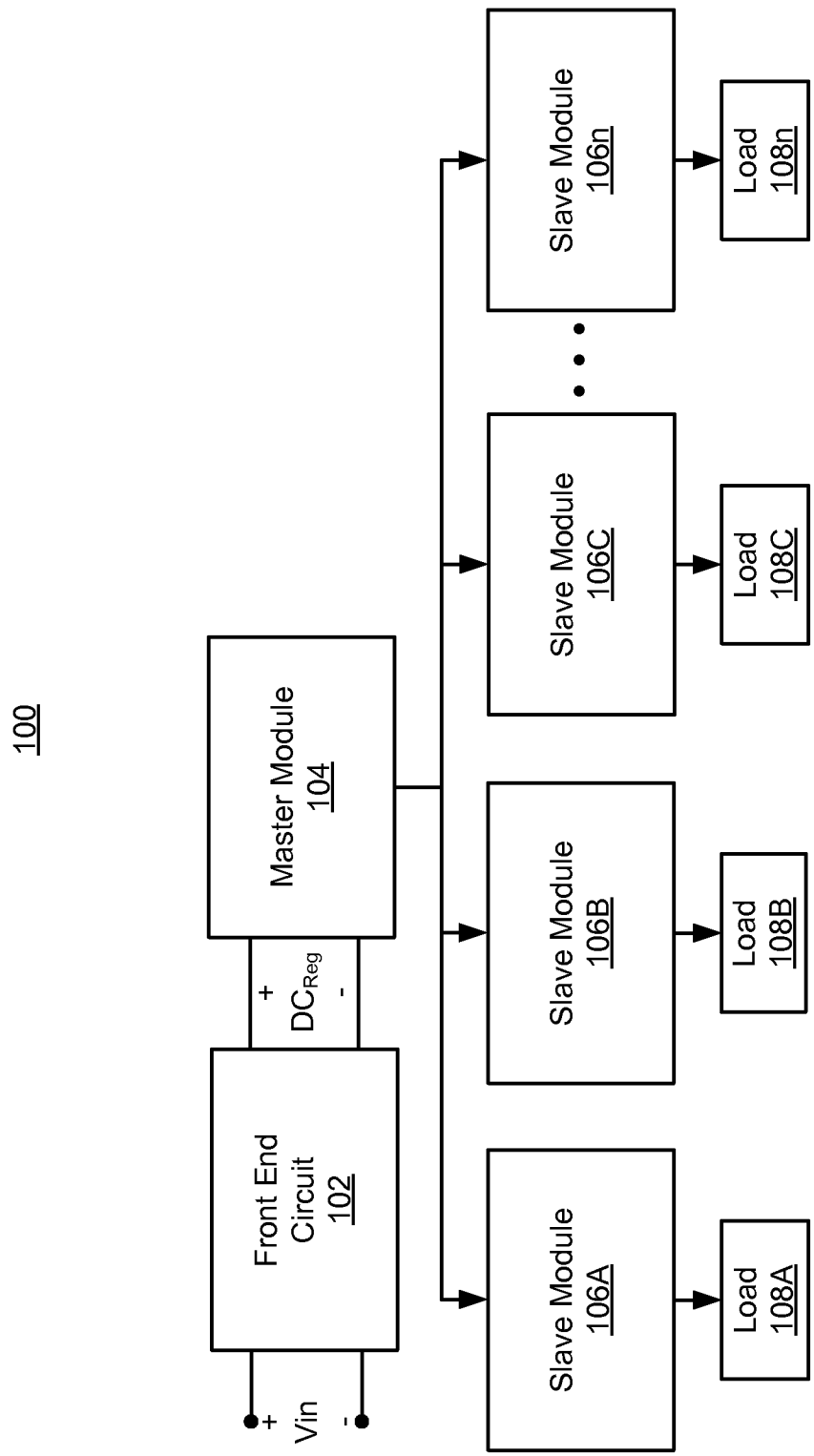
FIG. 1 shows a block diagram of a power supply system according to embodiments disclosed herein.

FIG. 1 shows a block diagram of a modular power supply system, which includes a front end circuit 102, a master module 104, and one or more slave modules 106A, 106B, 106C . . . 106n (collectively, the slave modules 106A-n). In some embodiments, the slave modules 106A-n are each coupled to respective loads, that is, the slave module 106A is coupled to a load 108A, the slave module 106B is coupled to a load 108B, the slave module 106C is coupled to a load 108C, and so forth. The front end circuit 102 is any circuit able to receive power from an AC voltage source (e.g., 120 VAC/60 Hz line source, 120-277 VAC at 50-60 Hz line source, etc.) or a DC voltage source (e.g., DC generator, battery, etc.) and to generate therefrom a regulated front end DC voltage $DC_{Reg}$. In embodiments where the front end circuit 102 receives an AC voltage an input, the front end circuit 102 may comprise an electromagnetic interference (EMI) filter and/or rectifier circuit that is configured to receive the AC voltage, filter out any interference, and to rectify the AC voltage into a DC input voltage. For example, the front end circuit 102 may comprise a capacitor arranged across the high and low AC input rails in to filter out EMI, and a diode rectifier configured to receive an AC input voltage and to generate the regulated front end DC voltage $DC_{Reg}$ therefrom.

The master module 104 is configured to receive the regulated front end DC voltage $DC_{Reg}$ from the front end circuit 102 and to output either a normal supply voltage or a reduced supply voltage as a supply voltage. The master module 104 outputs the supply voltage to the slave modules 106A-n, which use it to operate their respective loads 108A, 108B, 108C, . . . 108n (collectively, the loads 108A-n). In some embodiments, the master module 104 includes a master controller (not shown in FIG. 1 but shown in FIG. 2). The master controller is configured to determine that information needs to be communicated to the slave modules 106A-n and to enable the master module to so communicate it, among other tasks. For example, a user of the modular power supply system 100 may configure a user interface of the master module 104 (not shown in the figures) to indicate a control input. In embodiments where the loads 108A-n are light sources, the control input may indicate, for example, to raise or lower the amount of light output the light sources. The controller in the master module 104 then causes this information to be communicated to the slave modules 106A-n as described herein. The slave modules 106A-n receive this communicated information, as described herein, and control the light sources accordingly. While the slave modules 106A-n and the loads 108A-n have been illustrated in FIG. 1 and elsewhere as separate components, in some embodiments, the loads 108A-n are incorporated with their respective slave modules 106A-n to form a consolidated slave module/load apparatus (not shown in the figures). Further, while in FIG. 1 each load is shown as being coupled to a respective slave module, in some embodiments, more than one load is coupled to a single slave module.

Figure 2:
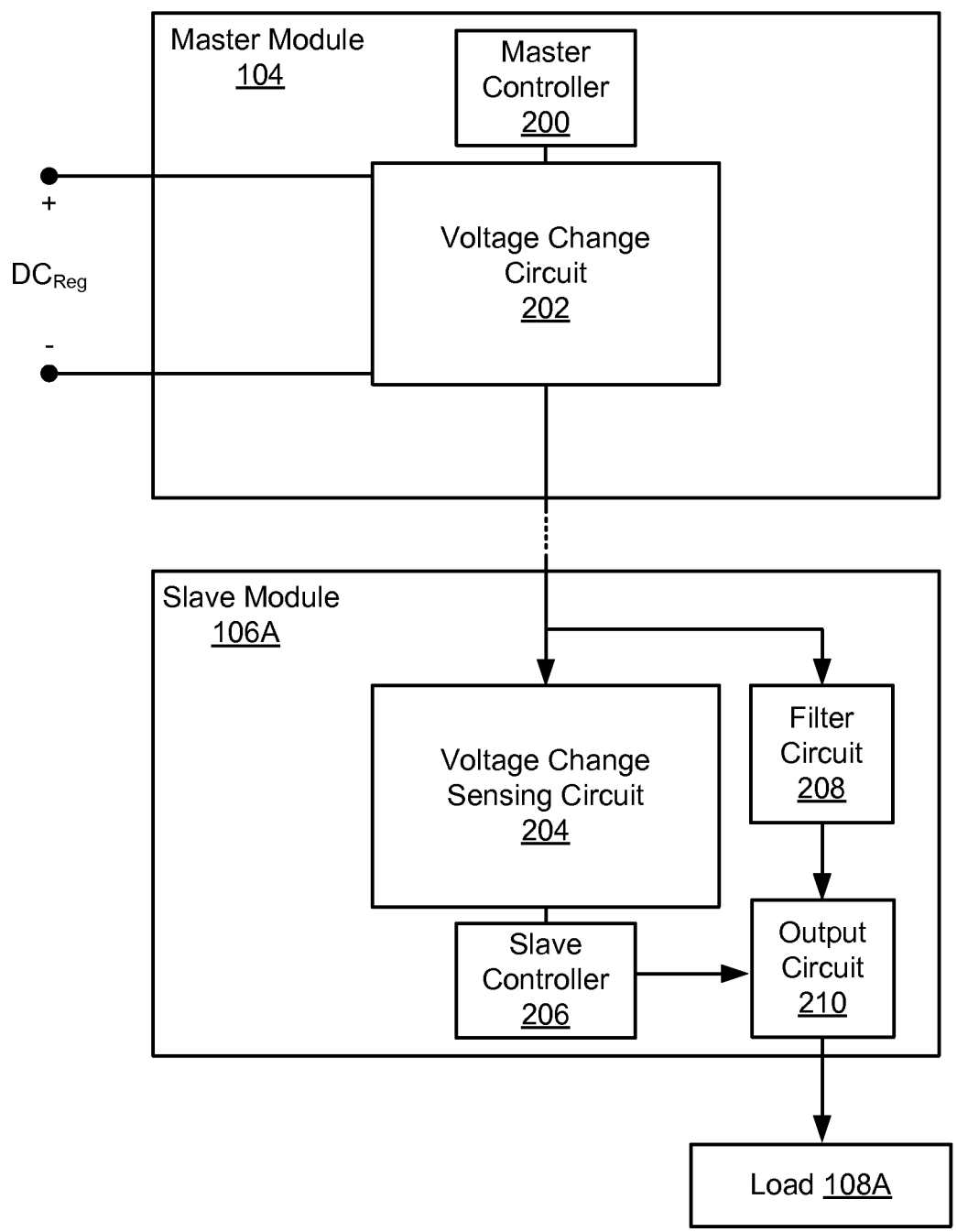
FIG. 2 shows a block diagram of a master module, a slave module, and a load of the power supply system of FIG. 1 according to embodiments disclosed herein.

FIG. 2 shows a block diagram of a master module, a slave module, and a load of the power supply system 100 of FIG. 1 in greater detail. The master module 104 includes a voltage change circuit 202 and a master controller 200. The voltage change circuit is connected to the front end circuit 102 of FIG. 1 and generates a supply voltage, which is then output by the master module 104. The supply voltage is either a normal supply voltage or a reduced supply voltage, with both types based on the regulated front end DC voltage $DC_{Reg}$ received from the front end circuit 102. The normal supply voltage is the typical output used by one or more of the slave modules 106A-n to operate one or more loads 108A-n. Thus, what is considered to be a normal supply voltage varies depending on the load and/or loads connected to the master module and its slave modules. In some embodiments, for example, where the loads 108A-n are solid state light sources, the normal supply voltage may be 24V. The reduced supply voltage is a voltage that is less than the normal supply voltage, and thus will also vary depending on a value for the normal supply voltage. The voltage change circuit generates the reduced supply voltage in any number of ways, some of which are described in greater detail below. The voltage change circuit 202 has two modes of operation. In the first mode of operation, the voltage change circuit generates the normal supply voltage as the supply voltage output by the master module. In the second mode of operation, the voltage change circuit 202 generates the reduced supply voltage as the supply voltage output by the master module. The mode of operation of the voltage change circuit 202 changes based on reception of a control input from the master controller 200. In some embodiments, the voltage change circuit 202 defaults to the first mode of operation when no control input has been received from the master controller 200.

Thus, the master controller 200 controls the type of supply voltage generated by the voltage change circuit 202 by providing a control input to the voltage change circuit 202 that causes the voltage change circuit 202 to change its mode of operation. The control input is based on the communication the master module is to send to the slave module, as is described herein. In some embodiments, the master controller 200 is configured to receive input from an outside source, for example but not limited to another module, a user interface, etc. The master controller 200 in such embodiments uses this input to create the control input. For example, the master controller 200 may receive an input from a user interface that indicates that the master module 104 should communicate information to a slave module to cause its load to operate differently than it is currently operating. The master controller translates the received input into a control input that is related to the information to be communicated. That is, sending the particular control input to the voltage change circuit 202 will cause the voltage change circuit to adjust the supply voltage it (and the master module 104) output to the appropriate slave module in such a way that the information to be communicated is communicated to the appropriate slave module, which will cause the appropriate slave module to change its load output, bringing about the desired change in the operation of the load. Any format that is capable of being communicated by a change in the supply voltage may be used, such as but not limited to those described in co-pending U.S. patent application Ser. No. 13/630,676, entitled "PULSE-BASED BINARY COMMUNICATION" and also assigned to OSRAM SYLVANIA Inc. of Danvers, Mass. Thus, the control input causes the voltage change circuit 202 to generate a normal supply voltage and/or a reduced supply voltage based on the received input. In some embodiments, the master controller 200 alternatively or additionally includes stored instructions, which may be stored within the master controller 200 upon manufacture and/or before sale and/or at some other time, such that the stored instructions provide one or more control inputs to be sent to the voltage change circuit 202 at certain times and/or based on certain operating conditions of a load connected to the master module 104 via one or more slave modules. In other words, the master controller 200 is capable of receiving a control input in any way and then provides the control input to the voltage change circuit 202.

Though only the slave module 106A is shown in FIG. 2, the slave module 106B, the slave module 106, . . . the slave module 106n may, and in some embodiments do, have the same configuration(s) of the slave module 106A. Thus, the disclosed configurations of the slave module 106A may be applied to any of the slave modules 106A-n. The slave module 106A includes a voltage change sensing circuit 204, a slave controller 206, a filter circuit 208, and an output circuit 210. The load 108A is coupled to the slave module 106A, and more particularly, to the output circuit 210. The voltage change sensing circuit 204 and the filter circuit 208 are configured to receive the supply voltage, which is either the normal supply voltage or the reduced supply voltage, from the master module 104. The voltage change sensing circuit 204 is configured to generate logic level voltages based on the received supply voltage. The logic level voltages correspond to changes in the received supply voltage, and thus to the information being communicated by the master module 104 to the slave module 106A. For example, receiving the normal supply voltage may result in the voltage change sensing circuit 204 generating a logic level of "1" (e.g., 24V) and receiving the reduced supply voltage may result in the voltage change sensing circuit 204 generating a logic level of "0" (e.g., 10 V), or vice versa. A particular combination of "1"s and "0"s may correspond to a particular command for the slave module 106A in relation to its load 108A, for example but not limited to change an operating parameter of the load 108A. Of course, other variations in the received supply voltage are also possible, such as but not limited to latches (e.g., a change in logic level occurs only after the voltage change sensing circuit 204 receives two different supply voltages in succession). Alternatively, or additionally, other combinations of "1"s and "0"s are used to communication information.

The logic level voltage(s) are sent by the voltage change sensing circuit 204 to the slave controller 206. The slave controller 206 interprets the received logic level voltages as a communication of information from the master module. The slave controller 206 performs this interpretation in any number of known ways. For example, the slave controller 206 may include a memory system that stores combinations of "1"s and "0"s in a lookup table, with each combination associated with a particular command and/or sequence of commands. Alternatively, or additionally, certain voltage logic level sequences may result in the activation and/or de-activation of one or more certain circuits with the slave controller 206. The slave controller 206 outputs a control output to the output circuit 210 that is based on the interpreted communicated information. The format of the control output depends on the information communicated to the slave module 106A. For example, in some embodiments, the control output is a signal that causes the output circuit 210 to vary the frequency of its load output signal, such as but not limited to a pulse width modulated signal. In some embodiments, the control output is a signal that causes the output circuit 210 to vary the amplitude of its load output signal. The slave controller 206 is capable of outputting any control output that is capable of affecting the operation of the load 108A.

The filter circuit 208 also receives the supply voltage from the master module 104. The filter circuit 208 is configured to supply a substantially continuous normal supply voltage to the output circuit 208, from where it is sent to the load 108A as described below, regardless of whether the filter circuit 208 receives the normal supply voltage or the reduced supply voltage. In other words, the filter circuit 208 protects the load 108A from ever receiving the reduced supply voltage, which would interrupt and/or modify operation of the load 108A, while still allowing the slave module 106A to receive the reduced supply voltage, thus permitting communication of information from the master module 104 to the slave module 106A through changes in the supply voltage. The filter circuit also filters out any unwanted variations in the supply voltage.

The output circuit 210 receives the normal supply voltage from the filter circuit 208 as the control output, if any, from the slave controller 206. The output circuit 210 provides a load output to the load 108A connected to the slave module 106A that is based on the output normal supply voltage and the control output, if any. Thus, if there is no control output, the output circuit 210 simply passes the output normal supply voltage from the filter circuit 208 to the load 108A. However, should the master module 104 communicate to the slave module 106A a change in the operation of the load 108A connected to the slave module 106A, the output circuit uses the control output from the slave controller 206, which corresponds to the change in operation, to modify the output normal supply voltage from the filter circuit 208 appropriately so as to create a load output that causes the desired change in operation in the load 108A.

While in FIG. 2 the slave controller 206 and the output circuit 210 are shown as separate elements, in some embodiments, these may be combined into a single element having the functionality of both the slave controller 206 and the output circuit 210. Thus, for example, the combined circuit may be a microcontroller that is capable of performing the operations of both the slave controller 206 and the output circuit 210, and thus would be connected to both the filter circuit 208 and the voltage change sensing circuit 204.

Figure 3:
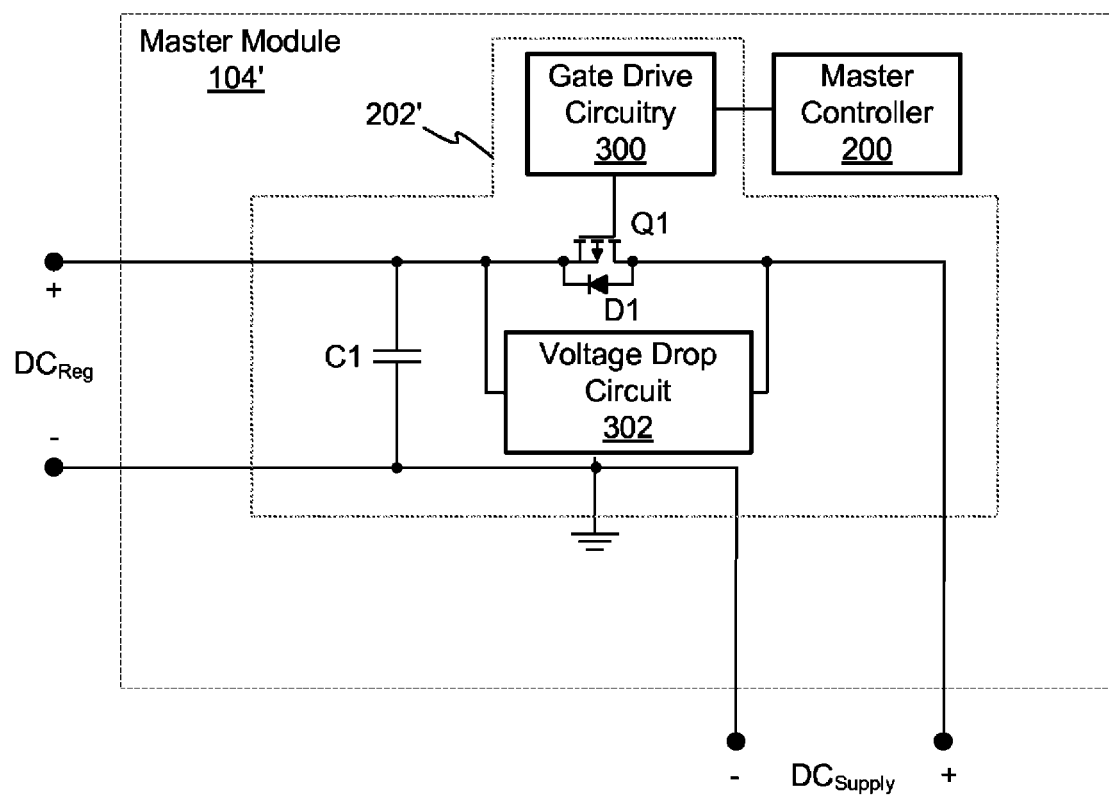
FIG. 3 is a circuit diagram of a master module according to embodiments disclosed herein.

FIG. 3 shows a circuit diagram of a master module 104', with the master controller 200 coupled to a voltage change circuit 202'. The voltage change circuit 202' includes a gate drive circuit 300, which is connected to the master controller 200. The gate drive circuit 300 is also coupled to a gate of a transistor Q1, which is a P-channel MOSFET. A source of the transistor Q1 is connected to high pole of the regulated front end DC voltage $DC_{Reg}$, and a drain of the transistor Q1 is connected to a voltage drop circuit 302. A diode D1 is connected across the source and the drain of the transistor Q1, with a cathode of the diode D1 connected to the source of the transistor Q1 and an anode of the diode D1 connected to the drain of the transistor Q1. The voltage drop circuit 302 is also connected to the source of the transistor Q1, and thus is also connected across the source and the drain of the transistor Q1, like the diode D1. A capacitor C1 is connected across the high pole and a low pole of the regulated front end DC voltage $DC_{Reg}$. The low pole of the regulated front end DC voltage $DC_{Reg}$ is connected to ground, and is also a low pole of the supply voltage $DC_{Supply}$, which is output by the master module 104'. A high pole of the supply voltage $DC_{Supply}$ is connected to the drain of the transistor Q1 and thus to anode of the diode D1 and to the voltage drop circuit 302.

The gate drive circuit 300 is configured to convert a voltage received from the master controller 200 to a voltage that drives the transistor Q1 in the manner desired for communicating with the slave modules 106A-n. For example, the voltage change circuit 202' in some embodiments is configured to receive the regulated front end DC voltage $DC_{Reg}$ from the front end circuit 102 shown in FIG. 1. The capacitor C1 to stabilizes the incoming regulated front end DC voltage $DC_{Reg}$. During the first mode of operation of the voltage change circuit 202', that is when there is no communication being sent to any slave module and the normal supply voltage is to be output from the master module 104' as the supply voltage $DC_{Supply}$, the master controller 200 causes the gate drive circuit 300 to provide a voltage to the gate of the transistor Q1, causing the transistor Q1 to conduct. This passes the regulated front end DC voltage $DC_{Reg}$ out of the master module 104' as the supply voltage $DC_{Supply}$. When the master controller 200 determines that the voltage change circuit 202' should be in its second mode of operation, such that the reduced supply voltage should be generated so as to send communication to a slave module, the master controller 200 causes the gate drive circuit 300 to provide a voltage to the gate of the transistor Q1 that ceases conduction through the transistor Q1, forcing the regulated front end DC voltage $DC_{Reg}$ to be conducted through the voltage drop circuit 302. The voltage drop circuit 302 is configured to drop the regulated front end DC voltage $DC_{Reg}$ a predetermined amount. The voltage drop circuit 302 comprises any circuit capable of creating a consistent voltage drop, such as but not limited to resistors, diodes, and the like. As a result, the supply voltage $DC_{Supply}$ changes from the normal supply voltage to the reduced supply voltage. In some embodiments, the diode D1 causes the voltage drop instead of the voltage drop circuit 302. In some embodiments, the diode D1 causes a voltage drop in addition to the voltage drop circuit 302.

Figure 4:
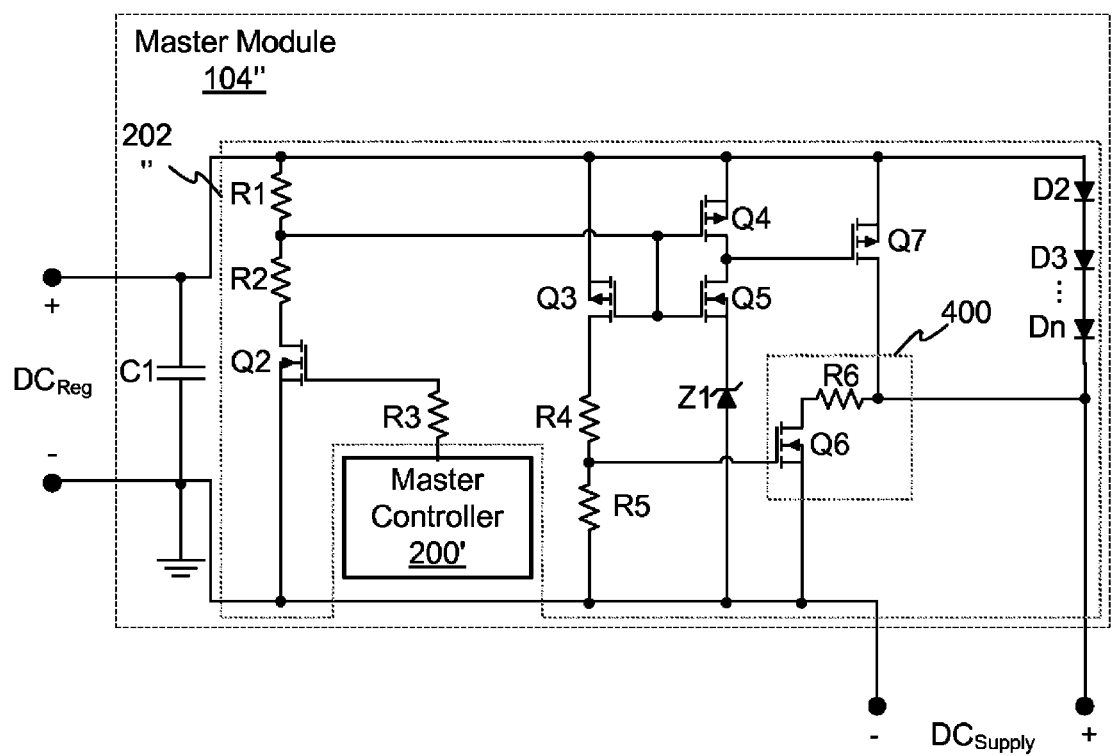
FIG. 4 is a circuit diagram of an alternative master module according to embodiments disclosed herein.

FIG. 4 is a circuit diagram of an alternative master module 104", which may allow for faster output transitioning than the master module 104' shown in FIG. 3, while using very little power during steady state operation (e.g., when not transitioning from the first mode of operation to the second mode of operation, and thus from outputting the normal supply voltage output to outputting the reduced supply voltage output, and vice versa). Further, the master module 104" includes a bleeder circuit 400, which may ensure that the transient (e.g., reduced supply voltage) can be generated during conditions that may restrict current draw to the load.

The master module 104" includes a voltage change circuit 202" that is configured to receive input from the master controller 200' and to output a normal supply voltage or a reduced supply voltage based on the input. The master controller 200' is a programmable microcontroller such as but not limited to the ATtiny85 microcontroller integrated circuit (IC) manufactured by the Atmel Corporation. In some embodiments, the master controller 200' is configured to output logic level voltages such as, for example, a "1" (5V) or a "0" (0V) to the voltage change circuit 202" based on, for example, information to be communicated to the slave modules 106A-n. During the first mode of operation (i.e., when the normal supply voltage is to be output from the master module 104"), the master controller 200' outputs a logical "0" (0V) to a gate of a transistor Q2 via a resistor R3. The transistor Q2 is an N-channel MOSFET, with a source connected to ground and a drain connected to a resistor R2. The resistor R2 is connected in series to a resistor R1, which is connected to a positive rail of the regulated front end DC voltage $DC_{Reg}$. The resistor R1 and the resistor R2 thus constitute a voltage divider. The transistor Q2 remains off, and thus, the regulated front end DC voltage $DC_{Reg}$ (e.g., 24V) does not drop over the resistor R1 and the resistor R2. A transistor Q3 and a transistor Q4 are each configured as a P-channel MOSFET with a source coupled to the positive rail and a gate coupled to a node between the resistor R1 and the resistor R2. A drain of the transistor Q3 is connected to a resistor R4, which is connected in series with a resistor R5, which is connected to ground. A node between the resistor R4 and the resistor R5 is connected to a gate of a transistor Q6, which is an N-channel MOSFET and is part of the bleeder circuit 400. A source of the transistor Q6 is connected to ground, and a drain of the transistor Q6 is connected to a resistor R6, which is also part of the bleeder circuit 400. The resistor R6 is connected to a drain of a transistor Q7, which is a P-channel MOSFET with a gate connected between the drain of the transistor Q4 and a drain of a transistor Q5, which is an N-channel MOSFET, and a source connected to the positive rail. The transistor Q5 includes a gate connected to the gates of the transistors Q3 and Q4, and a source connected to a Zener diode Z1. The Zener diode Z1 is also connected to ground.

Both the transistor Q3 and the transistor Q4 see the regulated front end DC voltage $DC_{Reg}$ at their respective gates and do not conduct. The transistor Q5 also sees the regulated front end DC voltage $DC_{Reg}$ at its gate, and does conduct, allowing the regulated front end DC voltage $DC_{Reg}$ to drop to the voltage rating of the Zener diode Z1 (e.g., given an example voltage rating of 18V, the regulated front end DC voltage $DC_{Reg}$ drops to 18V across the Zener diode Z1). Since the transistor Q3 is not conducting, no voltage is supplied to the resistor R4 and the resistor R5, which are connected in series as a voltage divider, and thus, 0V is provided to the gate of the transistor Q6. Since the transistor Q6 does not conduct, the bleeder circuit 400 is not on during the first mode of operation. 18V is supplied via the transistor Q5 to the gate of the transistor Q7, causing the transistor Q7 to conduct. This allows the normal supply voltage $DC_{Reg}$, e.g., 24V, to be provided to the slave modules 106A-n as the supply voltage $DC_{Supply}$.

In embodiments where the master controller 200' determines that the reduced supply voltage needs to be output as the supply voltage $DC_{Supply}$ by the master module 104" (i.e., that the master module 104" should be in the second mode of operation), the master controller 200' outputs a logical "1" (e.g., 5V) to the gate of the transistor Q2 through the resistor R3. The logical "1" output causes the transistor Q2 to conduct, coupling the resistor R1 and the resistor R2 to ground. In embodiments where the resistors R1 and R2 have the same resistance value (e.g., 250 ohms), then the regulated front end DC voltage $DC_{Reg}$ would be halved at the node between the resistor R1 and the resistor R2. The halved voltage is thus fed to the gates of the transistors Q3, Q4, and Q5, causing the transistors Q3 and Q4 to conduct, and the transistor Q5 to not conduct. The transistor Q4 then provides the regulated front end DC voltage $DC_{Reg}$ to the gate of the transistor Q7. Thus, the regulated front end DC voltage $DC_{Reg}$ does not drop over the Zener diode Z1 because the transistor Q5 is not conducting. Receiving the regulated front end DC voltage $DC_{Reg}$ at its gate causes the transistor Q7 to not conduct. The regulated front end DC voltage $DC_{Reg}$ is then forced through one or more series coupled diodes D2, D3, . . . Dn, collectively the diodes D2-n, which cause the regulated front end DC voltage $DC_{Reg}$ to drop, resulting in the reduced supply voltage, which is then output as the supply voltage $DC_{Supply}$ from the master module 104". The transistor Q3, which is conducting, also provides the regulated front end DC voltage $DC_{Reg}$ to the resistors R4 and R5, which causes the voltage at the node between the resistors R4 and R5 to drop depending on the values of the resistors R4 and R5. If, for example, the resistor R4 is 250 ohms, the resistor R5 is 100 ohms, and the regulated front end DC voltage $DC_{Reg}$ is 24V, at the node between the resistors R4 and R5, the voltage will be dropped to 7V. The dropped voltage (in the above example, 7V) is seen at the gate of the transistor Q6, causing the transistor Q6 to conduct and activating the bleeder circuit 400. The bleeder circuit 400 allows current to flow through the diodes D2-n regardless of the condition of the load (e.g., slave modules 106A-n), ensuring that the reduced supply voltage will be output as the supply voltage $DC_{Supply}$ from the master module 104".

Figure 5:
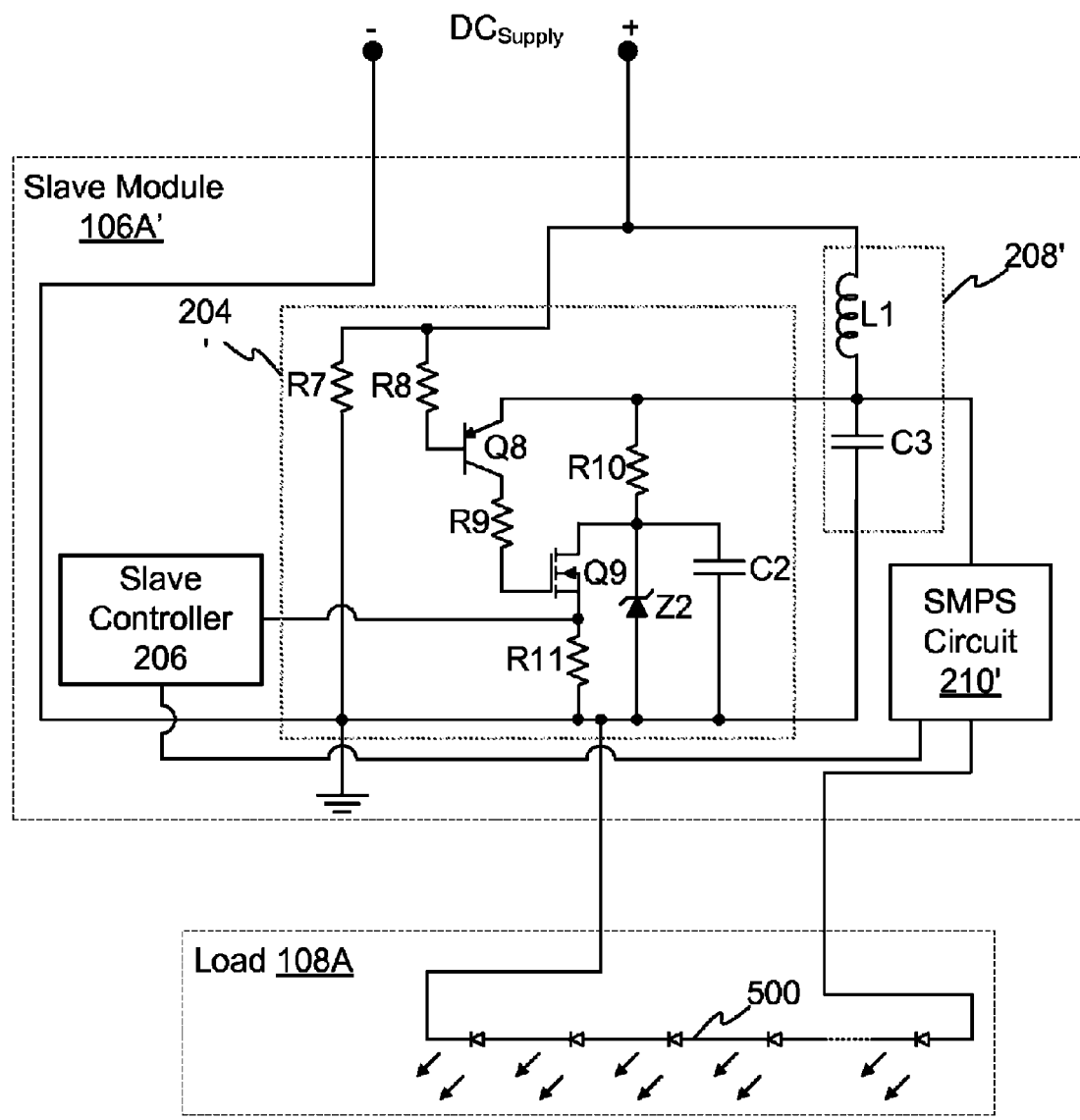
FIG. 5 is a circuit diagram of a slave module according to embodiments disclosed herein.

FIG. 5 is a circuit diagram of a slave module 106A', which allows a certain logic level voltage to be generated for a slave controller 206 while the reduced supply voltage is received from a master module. In this manner, a single logic level voltage signal (e.g., a high logic level signal for triggering functionality in the slave module 106A'), or a pattern of logic level signals (e.g., bits that may be organized as digital information such as a number, an information packet structure, etc.) may be communicated to the slave module 106A'. The slave module 106A' includes a voltage change sensing circuit 204', the slave controller 206, a filter circuit 208', and a switched mode power supply (SMPS) circuit 210'. In some embodiments, the voltage change sensing circuit 204' and the filter circuit 208' are configured to receive the normal supply voltage or the reduced supply voltage as the supply voltage $DC_{Supply}$ from a master module. The filter circuit 208' includes an inductor L1 and a capacitor C3 connected in series, with the inductor L1 connected to a positive node of the supply voltage $DC_{Supply}$ and the capacitor C3 connected to ground. A node between the inductor L1 and the capacitor C3 is connected to the voltage change sensing circuit 204' and to the SMPS circuit 210'. The filter circuit 208' acts as an LC filter or as an "RC tank" that is configured to maintain a substantially continuous normal supply voltage to the SMPS circuit 210'. Thus, even if the slave module 106A' receives the reduced supply voltage for short durations, the inductor L1 will discharge during these durations to maintain the voltage level of the capacitor C1. This behavior is designed to shield the SMPS circuit 210' from voltage fluctuations, and power line communication may occur in a substantially transparent manner with respect to at least the SMPS circuit 210' and the load 108A.

The voltage change sensing circuit 204' includes a resistor R7, a resistor R8, a resistor R9, a resistor R10, a resistor R11, a transistor Q8, a transistor Q9, a Zener diode Z2, and a capacitor C2. The resistor R7 is connected between the positive rail of the supply voltage $DC_{Supply}$ and ground. The resistor R8 is connected between the positive rail and a base of the transistor Q8. The transistor Q8 is a PNP device with an emitter connected to the node between the inductor L1 and the capacitor C3 of the filter circuit 208', and a conductor connected to the resistor R9. The resistor R9 is also connected to the gate of the transistor Q9, which is configured as an N-channel MOSFET. The transistor Q9 has a source connected to the resistor R11 and the slave controller 206, and a drain connected to the resistor R10, the capacitor C2, and a cathode of the Zener diode Z2. The resistor R10 is also connected to the node between the inductor L1 and the capacitor C3 of the filter circuit 208'. The resistor R11, the capacitor C2, and an anode of the Zener diode Z2 are also connected to ground.

The voltage change sensing circuit 204' is configured to generate logic level voltages for the slave controller 206 upon receiving the normal supply voltage or the reduced supply voltage as the supply voltage $DC_{Supply}$. For example, when the normal supply voltage is received as the supply voltage $DC_{Supply}$, the voltage across the transistor Q8 is zero (e.g., because there is no substantial difference between the received normal supply voltage and the voltage being output by the filter circuit 208'). The transistor Q8 does not turn on, and thus the transistor Q9 does not turn on, and so the voltage supplied to the slave controller 206 is a logical "0". However, when a reduced supply voltage is received, there will be a voltage drop across the transistor Q8, which will cause it to turn on, which will then cause the transistor Q9 to turn on. The voltage provided to slave controller 206 will then be based on the voltage rating of the Zener diode Z2 (e.g., 5 volts), which results in a logical "1" (i.e., 5V) being fed to the slave controller 206 while the reduced supply voltage is being received by the voltage change sensing circuit 204'. In some embodiments, employing an N-channel MOSFET for transistor Q9 and connecting the capacitor C2 provides an improved square pulse for the input signal sent to the slave controller 206, as compared to using an NPN transistor in place of the N-channel MOSFET transistor Q9. The logic level voltages thus correspond to information being communicated by the master module to the slave module 106A'.

In some embodiments, the slave controller 206 affects control in the slave module 106A' based on the logic level voltages received from the voltage change sensing circuit 204A'. In other words, the slave controller 206 interprets the different logic level voltages received as the communication of information from the master module. For example, as shown in FIG. 5, the slave controller 206 is coupled to the SMPS circuit 210', and may be configured to provide a particular signal, for example but not limited to an input voltage, a PWM signal, and the like, to the SMPS circuit 210' based on the received logic level voltages. In some embodiments, the SMPS circuit 210' includes a DC/DC converter, which may be any known topology for DC to DC conversion. The particular input provided by the slave controller 206 to the SMPS circuit 210' may control the characteristics of the output generated by the SMPS circuit 210', which is the load output sent to the load 108A. In some embodiments, the load 108A includes one or more solid state light sources, shown as a plurality of LEDs 500 in FIG. 5. The load output of the SMPS circuit 210' may drive the plurality of LEDs 500 to control the actual or perceived amount of light output thereby. For example, the actual amount of light output may be changed by changing the voltage level of the load output of the SMPS circuit 210', or the perceived amount of light output may be altered by changing the frequency of the PWM signal provided as the load output of the SMPS circuit 210'. In the latter case, changing the PWM signal affects the perceived output of the plurality of LEDs 500, which may still be outputting the same intensity of light, but the on/off "flickering" makes the overall light output change to the human eye.

Figure 6:
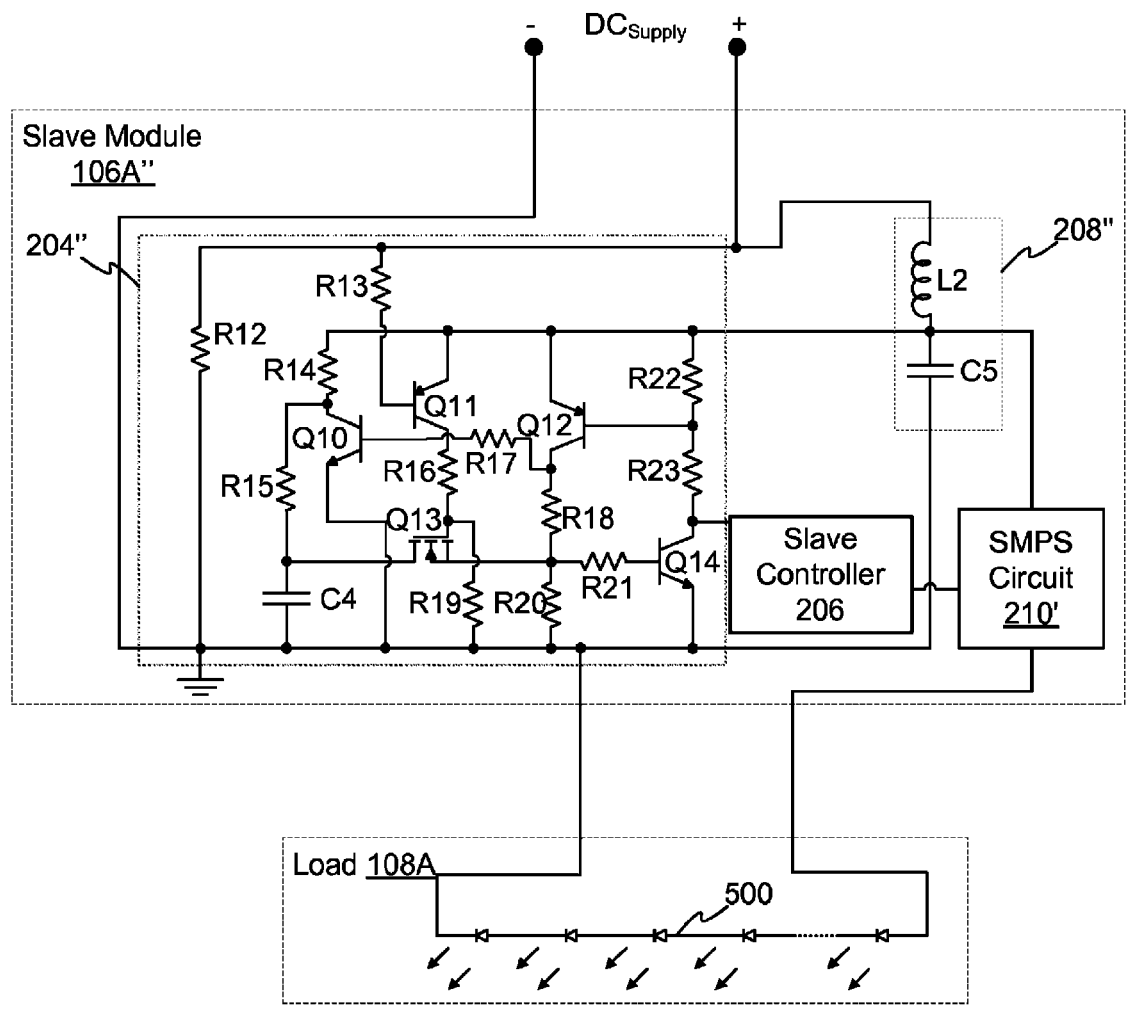
FIG. 6 is a circuit diagram of an alternative slave module according to embodiments disclosed herein.

FIG. 6 illustrates a circuit diagram of an alternative slave module 106A". Similar to FIG. 5, the slave module 106A" generates logic level voltages based on receiving the normal supply voltage or the reduced supply voltage. However, the slave module 106A" is configured to "latch" a certain logic level voltage generated when the reduced supply voltage is received, and may continue outputting the certain logic level after the normal supply voltage is received and until the reduced supply voltage is again received. The slave module 106A" includes the slave controller 206 and the SMPS circuit 210' (the same components as found in the slave module 106A'), and a voltage change sensing circuit 204" and a filter circuit 208". The filter circuit 208" includes an inductor L2 and a capacitor C5 connected in series. The inductor L2 is also connected to a positive pole of the supply voltage $DC_{Supply}$. The capacitor C5 is also connected to ground. A node between the inductor L2 and the capacitor C5 is connected to the voltage change sensing circuit 204" and the SMPS circuit 210'. The voltage change sensing circuit 204" includes a resistor R12, a resistor R13, a resistor R14, a resistor R15, a resistor R16, a resistor R17, a resistor R18, a resistor R19, a resistor R20, a resistor R21, a resistor R22, a resistor R23, a transistor Q10, a transistor Q11, a transistor Q12, a transistor Q13, a transistor Q14, and a capacitor C4, all arranged as described herein. The positive pole of the supply voltage $DC_{Supply}$ is connected to the resistor R12 and to the resistor R13. The resistor R12 is also connected to ground, which is connected to a negative pole of the supply voltage $DC_{Supply}$. The resistor R13 is also connected to a base of the transistor Q11, which is a PNP device. An emitter of the transistor Q11 is connected to the node between the inductor L2 and the capacitor C5 of the filter circuit 208". The node between the inductor L2 and the capacitor C5 of the filter circuit 208" is also connected to an emitter of the transistor Q12, the resistor R14, and the resistor R22. A collector of the transistor Q11 is coupled to the resistor R16. The resistor R16 is also connected to a gate of the transistor Q13, which is an N-channel MOSFET. The resistor R14 is also connected to a collector of the transistor Q10, which is an NPN device. An emitter of the transistor Q10 is connected to ground. A base of the transistor Q10 is connected to the resistor R17, which is also connected to a collector of the transistor Q12, which is a PNP device, and to the resistor R18. A base of the transistor Q12 is connected to a node between the resistors R22 and R23, which are connected in series. The resistor R23 is also connected to a collector of the transistor Q14, which is an NPN device. The collector of the transistor Q14 is also connected to the slave controller 206. An emitter of the transistor Q14 is connected to ground, and a base of the transistor Q14 is connected to the resistor R21. The resistor R21 is also connected to a node between the resistors R18 and R20, which are connected in series; that node is also connected to a source of the transistor Q13. The resistor R20 is also connected to ground. The resistor R19 is connected the gate of the transistor Q13 and to ground. The resistor R15 is connected to the collector of the transistor Q10, and also to a drain of the transistor Q13, which is also connected to the capacitor C4. The capacitor C4 is also connected to ground.

In some embodiments, the transistor Q11 captures the reduced supply voltage (e.g., the voltage drop in the reduced supply voltage as compared to the substantially normal supply voltage generated by filter circuit 208"). The transistor Q11 starts to conduct, causing the transistor Q13 to also start conducting, which causes a voltage of the charged capacitor C4 to be provided to the transistors Q12 and Q14. Thus, the transistors Q12 and Q14 latch high (e.g., 5V). The transistor Q10 also starts conducting at this time, discharging the capacitor C4 to ground. Since the capacitor C4 is at zero, the next transient event (e.g., the next time the reduced supply voltage is received by the slave module 106A") again causes the transistor Q11 and Q13 to conduct, which causes the transistors Q12 and Q14 to latch low. As a result, the logic level voltage is held constant between instances of the reduced supply voltage being received by the slave module 106A".

In some embodiments, such functionality may be employed in dimming or various other logic functions. For example, a user may manipulate a user interface (not shown) that is coupled to the master module 104 of FIG. 1 such as by, for example but not limited to, depressing a dimmer button. The dimmer button triggers the master controller 200 to cause the reduced supply voltage to be generated by the master module 104 as the supply voltage $DC_{Supply}$, which is then provided to the slave module 106A". The reduced supply voltage then causes the voltage change sensing circuit 204" to latch a high logic level voltage, and the slave controller 206 to alter the control output to the SMPS circuit 210'. For example, the slave controller 206 may continue to change the control output to increase or reduce the load output of the SMPS circuit 210' to the load 108A while the high logic level voltage is latched. When the user stops pressing the dimmer button, the master controller 200 causes the master module 104 to transmit (another) the reduced supply voltage, which causes the voltage change sensing circuit 204" to latch low, stopping the input adjustment being conducted by the slave controller 206 and thus stopping dimming in the load 108A.

Figure 7:
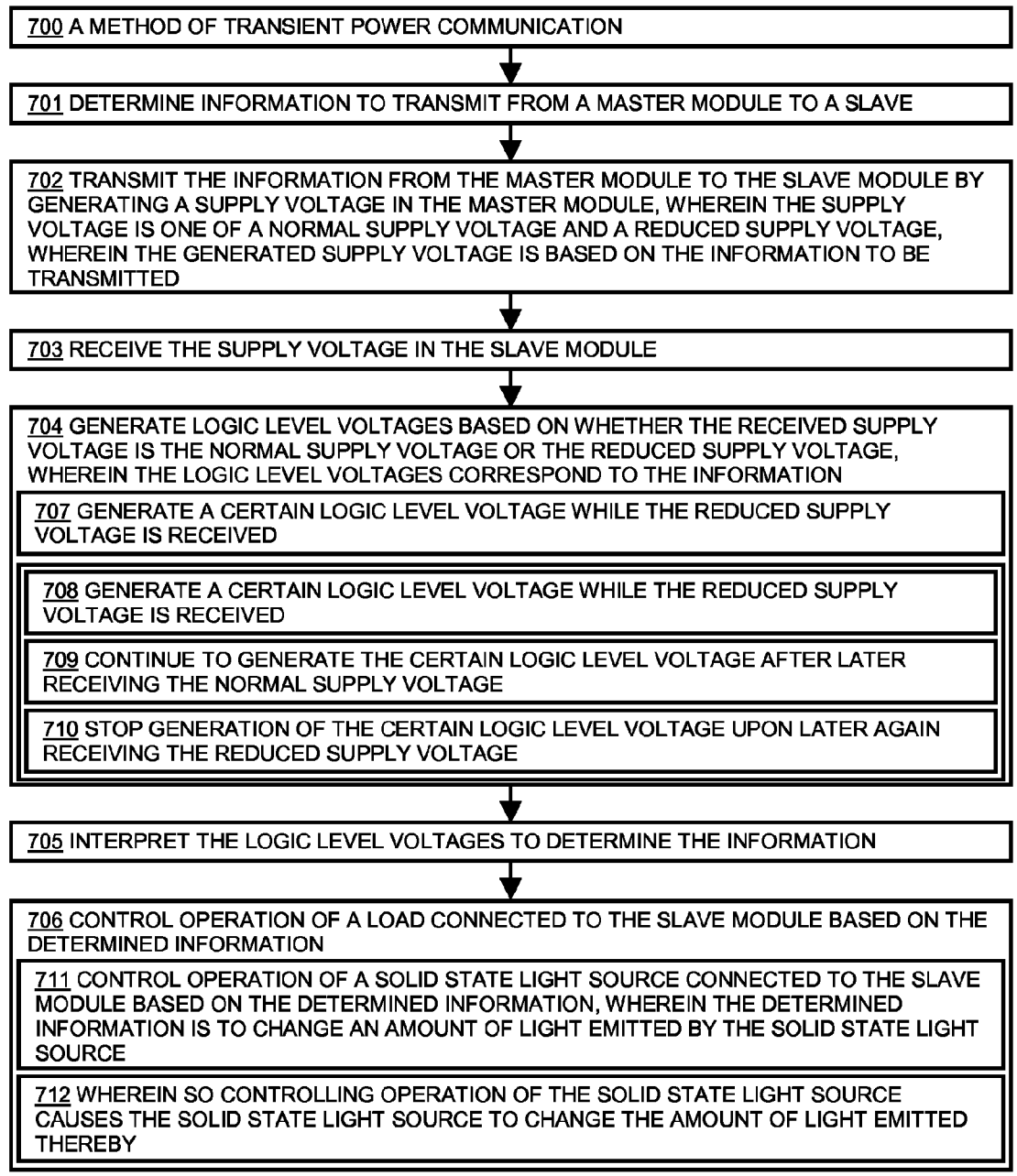
FIG. 7 is a flowchart of a method of transient power communication according to embodiments disclosed herein.

FIG. 7 is a flowchart of a method of transient power communication 700 according to embodiments disclosed throughout. flowchart illustrates the functional information one of ordinary skill in the art requires to fabricate circuits and/or to generate computer software/firmware to perform the processing required in accordance with embodiments. It will be appreciated by those of ordinary skill in the art that unless otherwise indicated herein, the particular sequence of steps described is illustrative only and may be varied without departing from the spirit of the invention. Thus, unless otherwise stated, the steps described below are unordered, meaning that, when possible, the steps may be performed in any convenient or desirable order.

Further, while FIG. 7 illustrates various operations, it is to be understood that not all of the operations depicted in FIG. 7 are necessary for other embodiments to function. Indeed, it is fully contemplated herein that in other embodiments of the present disclosure, the operations depicted in FIG. 7, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

In FIG. 7, information is determined, the information to be transmit from a master module to a slave module, step 701. The information is transmitted from the master module to the slave module, step 702, by generating a supply voltage in the master module, wherein the supply voltage is one of a normal supply voltage and a reduced supply voltage, wherein the generated supply voltage is based on the information to be transmitted. The supply voltage is received in the slave module, step 703. Logic level voltages are generated, step 704, based on whether the received supply voltage is the normal supply voltage or the reduced supply voltage, wherein the logic level voltages correspond to the information. The logic level voltages are interpreted, step 705, to determine the information. Operation of a load connected to the slave module is controlled, step 706, based on the determined information.

In some embodiments, the logic level voltages are generated by generating a certain logic level voltage while the reduced supply voltage is received, step 707.

In some embodiments, the logic level voltages are generated by first generating a certain logic level voltage while the reduced supply voltage is received, step 708, and then continuing to generate the certain logic level voltage after later receiving the normal supply voltage, step 709, and then stopping generation of the certain logic level voltage upon later again receiving the reduced supply voltage, step 710.

In some embodiments, the load is a solid state light source, and operation of the solid state light source is controlled based on the determined information, step 711, wherein the determined information is to change an amount of light emitted by the solid state light source, so controlling operation of the solid state light source causes the solid state light source to change the amount of light emitted thereby, step 712.

As used in any embodiment herein, a "circuit" or "circuitry" may comprise, for example, singly or in any combination, hardwired circuit, programmable circuit, state machine circuit, and/or firmware that stores instructions executed by programmable circuit.

The term "coupled" as used herein refers to any connection, coupling, link or the like by which signals carried by one system element are imparted to the "coupled" element. Such "coupled" devices, or signals and devices, are not necessarily directly connected to one another and may be separated by intermediate components or devices that may manipulate or modify such signals. Likewise, the terms "connected" or "coupled" as used herein in regard to mechanical or physical connections or couplings is a relative term and does not require a direct physical connection.

The methods and systems described herein are not limited to a particular hardware or software configuration, and may find applicability in many computing or processing environments. The methods and systems may be implemented in hardware or software, or a combination of hardware and software. The methods and systems may be implemented in one or more computer programs, where a computer program may be understood to include one or more processor executable instructions. The computer program(s) may execute on one or more programmable processors, and may be stored on one or more storage medium readable by the processor (including volatile and non-volatile memory and/or storage elements), one or more input devices, and/or one or more output devices. The processor thus may access one or more input devices to obtain input data, and may access one or more output devices to communicate output data. The input and/or output devices may include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processor as provided herein, where such aforementioned examples are not exhaustive, and are for illustration and not limitation.

The computer program(s) may be implemented using one or more high level procedural or object-oriented programming languages to communicate with a computer system; however, the program(s) may be implemented in assembly or machine language, if desired. The language may be compiled or interpreted.

As provided herein, the processor(s) may thus be embedded in one or more devices that may be operated independently or together in a networked environment, where the network may include, for example, a Local Area Network (LAN), wide area network (WAN), and/or may include an intranet and/or the internet and/or another network. The network(s) may be wired or wireless or a combination thereof and may use one or more communications protocols to facilitate communications between the different processors. The processors may be configured for distributed processing and may utilize, in some embodiments, a client-server model as needed. Accordingly, the methods and systems may utilize multiple processors and/or processor devices, and the processor instructions may be divided amongst such single- or multiple-processor/devices.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s) or smart cellphone(s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the internet. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" and/or "an and/or the to modify a noun may be understood to be used for convenience and to include one, or more than one, of the modified noun, unless otherwise specifically stated. The terms "comprising", "including" and "having" are intended to be inclusive and mean that there may be additional elements other than the listed elements.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. A method of transient power communication, comprising:
   determining information to transmit from a master module to a slave module;
   transmitting the information from the master module to the slave module by generating a supply voltage in the master module, wherein the supply voltage is one of a normal supply voltage and a reduced supply voltage, wherein the generated supply voltage is based on the information to be transmitted;
   receiving the supply voltage in the slave module;
   generating logic level voltages based on whether the received supply voltage is the normal supply voltage or the reduced supply voltage, wherein the logic level voltages correspond to the information;
   interpreting the logic level voltages to determine the information; and
   controlling operation of a load connected to the slave module based on the determined information.

2. The method of claim 1, wherein generating logic level voltages comprises generating a certain logic level voltage while the reduced supply voltage is received.

3. The method of claim 1, wherein generating logic level voltages comprises:

generating a certain logic level voltage while the reduced supply voltage is received;
continuing to generate the certain logic level voltage after receiving the normal supply voltage instead of the reduced supply voltage; and
stopping generation of the certain logic level voltage upon again receiving the reduced supply voltage.

4. The method of claim 1 wherein controlling comprises:
controlling operation of a solid state light source connected to the slave module based on the determined information, wherein the determined information is to change an amount of light emitted by the solid state light source; and
wherein so controlling operation of the solid state light source causes the solid state light source to change the amount of light emitted thereby.

* * * * *